No. 779,589. PATENTED JAN. 10, 1905.
F. P. DEWEY.
ELECTRIC BATTERY.
APPLICATION FILED MAR. 25, 1902. RENEWED MAY 19, 1904.
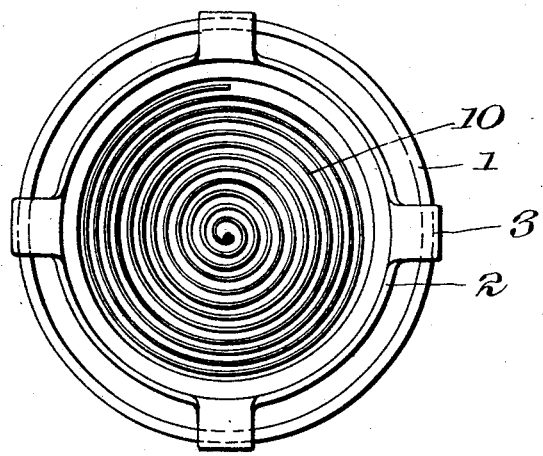
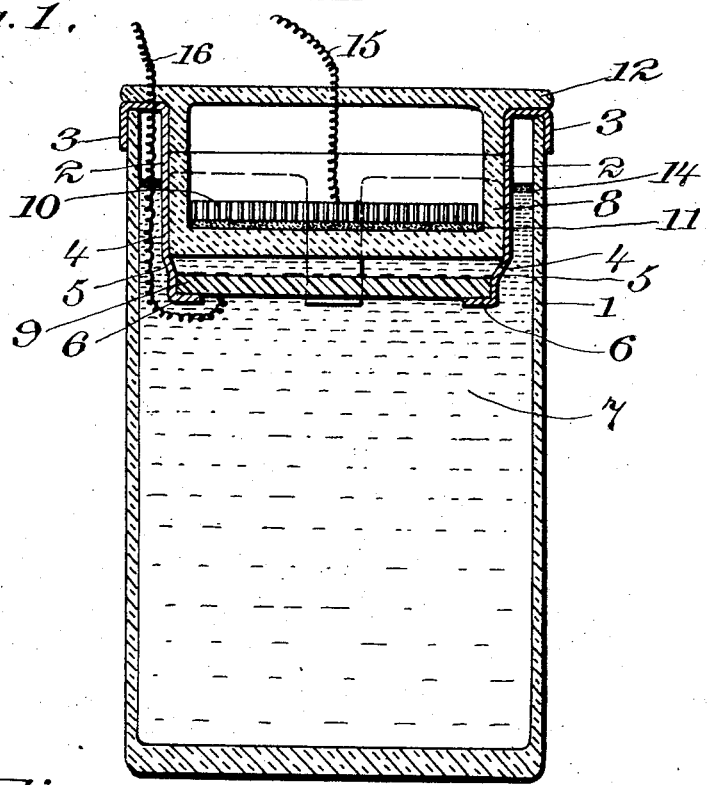
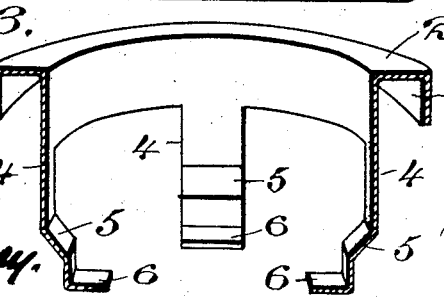
WITNESSES: INVENTOR
Frederic P. Dewey
BY
ATTORNEY No. 779,589.

Patented January 10, 1905.

UNITED STATES PATENT OFFICE.

FREDERIC P. DEWEY, OF WASHINGTON, DISTRICT OF COLUMBIA.

ELECTRIC BATTERY.

SPECIFICATION forming part of Letters Patent No. 779,589, dated January 10, 1905.

Application filed March 25, 1902. Renewed May 19, 1904. Serial No. 208,672.

*To all whom it may concern:*

Be it known that I, FREDERIC P. DEWEY, a citizen of the United States of America, and a resident of Washington, District of Columbia, have invented certain new and useful Improvements in Electric Batteries, of which the following is a specification.

My invention relates in general to electric batteries; and, more specifically, it consists of a primary electric battery designed to produce a constant current and preferably operating upon a circuit which is closed for a considerable portion of the time of the life of the battery.

It is well known that when two metals or substances are placed in a solution which attacks one of them more than the other and they are connected outside the liquid by a conductor of electricity an electric current is generated and one of the metals or substances goes into solution, while hydrogen is separated at the surface of the other metal. Among the difficulties encountered in a simple battery of the above description are two important results of the development of the hydrogen at or upon the surface of the metal or element which is least attacked by the active solution. The hydrogen so formed coats the surface of the said element, called the "cathode," thus reducing its effective surface in contact with the liquid, and it creates a stress or counter-current opposed to the main current, thus reducing the effectiveness of the main current by what is termed "polarization." Under these conditions the generation of current rapidly decreases and soon practically ends. The same conditions prevail whether the insoluble element is a metal or is a non-metallic material, such as carbon. Different means have been employed in practical electric batteries in the attempt to prevent the separation of the hydrogen and overcome polarization. Various chemical reagents have been used as depolarizers to combine with the hydrogen. Mechanical depolarizers of several types have been employed. The surface of the less soluble element or cathode-plate has been made relatively large and rough, and agitation and circulation have been employed to displace the hydrogen as soon as formed. Combination chemical and mechanical depolarizers have been tried where the cathode was made porous for the purpose of condensing oxygen in its pores to combine with the hydrogen and form water.

The main features of my invention relate to the disposal of the hydrogen so as to prevent the occurrence of the above-described disadvantageous conditions and comprise means for promptly and continuously disposing of the hydrogen as formed by giving it the utmost possible freedom of separation from the surface of the cathode. To this end the battery is so arranged that the cathode is not immersed in the electrolyte or active solution or brought into contact with any considerable body thereof at any one time; but, on the contrary, the surface of said cathode is covered uniformly and constantly with a thin film only of said electrolyte. I secure this result by bringing the electrolyte into contact only with a minute portion of the surface of the cathode and permitting said electrolyte to spread over the entire surface in a thin layer or film by the action of surface attraction. By just bringing the cathode into contact with the electrolyte and by maintaining only a thin film of the electrolyte over the surface of the cathode the hydrogen as it forms is not held against the cathode by hydrostatic pressure until it accumulates into bubbles of sufficient size to rise against this pressure, as occurs in case of immersion, but the pressure is so slight that the hydrogen separates from the cathode at once, and thus it neither reduces the effective surface of the plate nor does it set up a counter stress against the main current.

In the preferred form of my invention the cathode is located above the electrolyte and is in the shape of a thin plate or ribbon set on edge. Preferably the electrolyte is brought to the lower edge of the cathode by capillary action of the pores existing in an interposed porous diaphragm, such as the bottom of a porous cup or similar construction, and from this point of contact at the lower edge the liquid spreads over the two surfaces of the cathode-plate by surface attraction. One form of such battery is illustrated in the accompanying sheet of drawings, in which—

Figure 1 is a vertical central section of one cell of battery constructed in accordance with my invention. Fig. 2 is a plan view of the same, and Fig. 3 is a perspective view of one-half of the supporting apparatus for the battery elements.

Throughout the drawings like reference-figures indicate like parts.

The battery may be contained in any suitable jar 1, of glass, porcelain, or other material, upon the top of which I prefer to rest the supporting-frame 2. This supporting-frame is preferably in the shape of a skeleton thimble the overhanging rim 3 (or lugs 3ª, as shown in Fig. 2) of which fits over the top of the jar. The thimble has the downwardly-projecting prongs 4 4, &c. These prongs are preferably given an inward inclination at their lower portion 5 5, &c., and terminate in horizontal lugs 6 6, &c. This skeleton thimble should preferably be made of gutta-percha or some other material which is a non-conductor of electricity and is not attacked by the solution 7, which forms the electrolyte. The porous cup 8 or other porous diaphragm, of unglazed porcelain or equivalent material, is placed within the thimble 2 and is supported by the inwardly-inclined portions 5 5 of the fingers 4 4. One of the poles of the battery, which may be a zinc plate 9, is supported by the lugs 6 6. This zinc plate forms the anode of the battery. The cathode consists, preferably, of the coil of copper or nickel ribbon 10, which is wound into a spiral form and placed within the porous cup. A piece of asbestos-cloth 11 may be placed in the bottom of the porous cup, so that the cathode will rest thereon. Any suitable cover 12 is provided for closing the top of the porous cup and also of the jar. With the above elements—zinc and copper—I preferably employ a solution of caustic potash or caustic soda for the electrolyte 7 and place a film 14, of oil, on the surface thereof to prevent access of the carbonic acid of the air to the electrolyte and also to prevent unnecessary evaporation thereof. A wire 15 or other connection extends to the cathode-plate and another wire 16 or other electrical connection extends to the anode or zinc plate. The sides of the porous cup are preferably glazed or otherwise rendered impervious to water.

When in a battery so constructed the quantity of the electrolyte is so proportioned as to bring the level thereof up to or slightly above the bottom of the porous cup, said electrolyte penetrates the pores of said cup and comes into contact with the lower edge of the copper spiral, from which it will spread out in a thin film over the entire surface of said spiral. The asbestos diaphragm 11 serves to insure the equal distribution of the fluid over the entire lower edge of the copper spiral. If then the two wires 15 16 are connected either directly or through an intervening electric circuit, chemical action is set up, which results in the development of an electric current through said circuit. This action consists of the slow oxidation of the zinc plate or anode by the electrolyte, thereby forming oxid of zinc, which is dissolved by the caustic soda. The hydrogen thus released by the dissociation of the atoms of hydrogen and oxygen forming the water composing the main portion of the solution passes to the surface of the copper spiral or cathode-plate. Not being confined by hydrostatic pressure or otherwise, the law of the diffusion of gases causes said atoms of hydrogen to be instantly released and mingled with the surrounding atmosphere. Consequently the surface of the cathode-plate remains always free and active and the action of the battery proceeds without hindrance or interruption.

The advantages resulting from the use of my invention comprise the production of a battery which furnishes a constant current as long as any portion of the anode remains unoxidized. The invention secures the result so desirable in primary electric batteries—that is to say, the perfect maintenance of the initial *status quo*. As long as the anode lasts there is no polarization of the battery and no diminution of the chemical activity originally set up when the circuit is first completed. Cells of this battery giving a good commercial current have in practice run for many hours on continuous test without serious diminution of the current produced. This result is mainly due to two causes: first, to the complete and prompt liberation of the hydrogen as formed; second, to the fact that there is neither leakage nor evaporation of the solution forming the electrolyte. Being diffused to the cathode by capillary attraction or by infiltration under slight pressure through the porous cup or diaphragm, there can be no excess of the solution supplied to the cathode and consequently wasted. The consumption of water is small, and, besides, the oxygen of the water decomposed remains in the electrolyte in combination with the dissolved zinc. Consequently the water-line of the solution in which the anode is submerged varies but slightly even in a long test. The combined thickness of the intervening diaphragm of asbestos and of the bottom of the porous cup is enough to more than include small variations of level so resulting, and thus insure the drawing upward or passage inward of sufficient electrolyte to keep the lower edge of the cathode-plate wet at all times.

It is evident, of course, that various changes could be made in the apparatus shown in the drawings without departing from the spirit and scope of my invention, so long as the principle of operation above described is maintained. Other materials for the cathode, the anode, and the electrolyte might be employed. The containing vessel might be of different shape and material. The porous cup might be of different form or might be dispensed with entirely. The shapes and physical forms of the cathode and of the anode or of either of them might be varied; but all such modifications I should yet consider mere variations in form still containing the essence of my invention so long as the same idea of means were retained for maintaining the initial *status quo* of the battery.

Having therefore described my invention, what I claim as new, and desire to protect by Letters Patent, is—

1. An electric battery in which the cathode is in the shape of a thin flat strip and is maintained in contact with main body of the electrolyte at one edge only of said strip.

2. An electric battery in which the cathode is located above the electrolyte and has only a minute portion of its surface maintained in contact with the main body of such electrolyte.

3. In an electric battery a cathode so maintained in contact with the electrolyte that its entire surface is covered by a thin film of the electrolyte.

4. An electric battery comprising in combination a containing vessel, an anode, a liquid electrolyte, and a cathode so maintained in contact with the electrolyte that its surface is covered throughout by a thin film only of the electrolyte.

5. In an electric battery, the combination of a containing vessel, a liquid electrolyte, an anode submerged therein, a cathode formed of a plate set on edge and supported above the electrolyte and having its lower edge only maintained in contact with main body of said electrolyte.

6. In an electric battery, the combination of a containing vessel, a liquid electrolyte, an anode submerged therein, a cathode formed of a plate set on edge and supported above the electrolyte and having its lower edge only in contact with main body of said electrolyte, together with a porous diaphragm interposed between said cathode and the main body of the electrolyte.

7. In an electric battery, the combination of a containing vessel, a liquid electrolyte, an anode submerged therein, a diaphragm of rigid but porous material at the upper surface of the electrolyte, a layer of absorbent material upon the upper side of said diaphragm, and a cathode supported upon said layer of absorbent material.

8. In an electric battery, the combination of a containing vessel, a liquid electrolyte, an anode submerged therein, a diaphragm of rigid but porous material at the upper surface of the electrolyte, a layer of absorbent material upon the upper side of said diaphragm, and a cathode supported upon said layer of absorbent material, said cathode being so shaped that only a small portion of its surface is in contact with said absorbent material.

9. In an electric battery, the combination of a containing vessel, a liquid electrolyte, an anode submerged therein, a porous cup at the upper surface of the electrolyte and a cathode located in said porous cup and so shaped that a small portion only of its surface is in contact with the main body of liquid through the minute portion of liquid which diffuses into said cup.

10. In an electric battery, the combination of a containing vessel, a liquid electrolyte, an anode submerged therein, a porous cup at the upper surface of the electrolyte and a cathode located in said porous cup and consisting of a thin ribbon coiled into a spiral, whose axis is vertical and parallel to the surface of the ribbon.

Signed at New York city, New York, this 19th day of March, 1902.

FREDERIC P. DEWEY.

Witnesses:
R. GERBRACHT, Jr.,
L. E. PEARSON.